June 8, 1965 L. F. VERGIN 3,188,014

TAPE RECORDER

Filed Feb. 9, 1962 3 Sheets-Sheet 1

INVENTOR.
Leo F. Vergin

BY
Francis W. Crotty
Atty.

June 8, 1965 L. F. VERGIN 3,188,014

TAPE RECORDER

Filed Feb. 9, 1962 3 Sheets-Sheet 2

INVENTOR.
Leo F. Vergin
BY
Francis W. Crotty
Atty.

June 8, 1965 L. F. VERGIN 3,188,014

TAPE RECORDER

Filed Feb. 9, 1962 3 Sheets-Sheet 3

INVENTOR.
Leo F. Vergin
BY
Francis W. Crotty
Atty.

United States Patent Office 3,188,014
Patented June 8, 1965

3,188,014

TAPE RECORDER

Leo F. Vergin, Chicago, Ill., assignor to Zenith Radio Corporation, Chicago, Ill., a corporation of Delaware Filed Feb. 9, 1962, Ser. No. 172,212
8 Claims. (Cl. 242—55.13)

This invention relates to recording and reproducing devices. More particularly, it relates to apparatus for playing a record bearing member such as a tape housed in a cartridge.

There are numerous types of recording and reproducing equipment available and they may be readily divided into two classes. In the first class are those devices which employ two interchangeable reels and have a transport mechanism which moves the record, be it tape or wire, from reel to reel. In the second class there are those devices which employ magazines containing the records. The simplest device of the latter class employs a cartridge containing both a supply reel having the record wound thereon and a take-up reel for receiving the record as it is being played. A preferred device of the magazine type utilizes cartridges, individually having a record wound upon a supply reel therein, in conjunction with a single take-up reel serving all cartridges that are played.

With the development of a recording cartridge containing only a supply reel which is approximately the size of a folded handkerchief, it has been possible to construct a recording and reproducing device for such cartridges which selectively transcribes one or a plurality of them. In devices which automatically transcribe a plurality of cartridges it is desirable to have a bin or well for retaining them prior to their transcription. Unlike record changers where the records remaining to be played are readily accessible because they are positioned at the top end of vertical spindle, cartridges yet to be transcribed are housed in the bin and are inaccessible. In automatic machines it is desirable to be able to readily reject or eject these cartridges from the bin without the necessity of transcribing any portion of the tape of each cartridge as required to accomplish ejection by means of the automatic programming mechanism of the device.

In Patents 3,105,645 and 3,105,646 issued respectively to Richard L. Rost and Eugene J. Polley et al., respective pending divisional applications of the above patents, Serial Nos. 305,968 and 305,988 and in a copending application of Ralph Galke et al., Serial No. 122,715, all assigned to the same assignee as the present invention, there are described and claimed apparatus which are closely related to the present invention.

It is a general object of this invention to provide a new and improved reeling apparatus which automatically plays a plurality of pre-recorded tapes or wires contained in individual cartridges.

It is also an object of this invention to provide a magazine type of recording/reproducing apparatus which ejects cartridges remaining to be transcribed without the need of transcribing any portion of each such cartridge.

It is a further object of this invention to provide manually actuated cartridge ejecting mechanism for such a magazine type of apparatus which is inexpensive to manufacture, utilizes a minimum number of components, and is easy to operate.

In accordance with the invention reeling apparatus which is employed for transcribing a plurality of flexible tapes, each respectively housed on separate supply reels, comprises a bin having a major opening for accepting and storing the supply reels. Furthermore, the apparatus comprises a supply-reel feeding mechanism for sequentially feeding one stored reel at a time from the bin and a transport mechanism having a playing cycle for transcribing the tape and having a rewind cycle for rewinding the tapes on their supply reels. In addition, the apparatus comprises a program mechanism for controlling the operation of the transport mechanism and the feeding mechanism. Also included in the reeling apparatus is a single manually actuated control member, effective during the playing cycle, for interrupting the playing cycle and initiating the rewind cycle and effective during rest intervals of the transport mechanism for actuating the supply-reel feeding mechanism.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
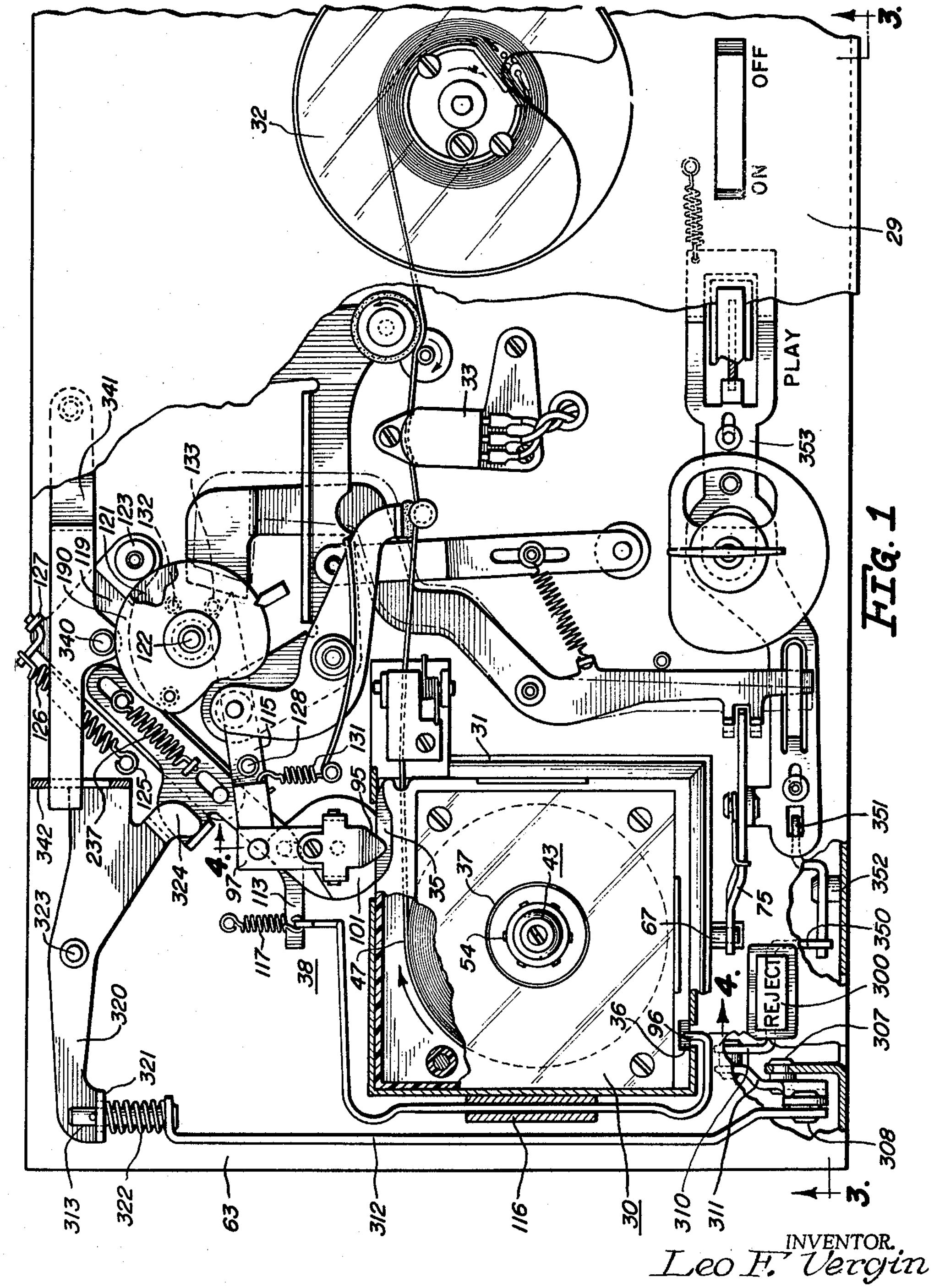
FIGURE 1 is a fragmentary plan view, partly broken away, of apparatus embodying the invention.

The apparatus of FIGURE 1 may be used for transcribing tape, wire or other flexible recording media but, as illustrated, is employed for recording and reproducing on tape. The arrangement comprises a tape deck or transport which has a playing cycle for transcribing the tape and a rewind cycle for rewinding the tape on its supply reel. As major component parts the tape deck has a top plate or cover 29, one or more cartridges 30 of tape, a storage bin 31 for accommodating such cartridges, a feeding mechanism 38 to present the cartridges seriatum to a playing position, a take-up arrangement including a reel 32 through which tape is presented in coupling relation or reeling relation to a magnetic transducer head 33, a driving system to effect winding of the tape as between the supply and take-up reels, and a programming arrangement through which the several functions are properly correlated in a playing cycle. In addition, a cartridge-reject mechanism is provided so that the cartridges may be readily ejected from the bin without the need of transcribing any portion of the tape of each cartridge. For convenience, cartridge 30, feeding mechanism 38, and the cartridge-reject mechanism will be described in detail herein; however, reference is hereby made to the previously mentioned copending applications for a detailed description of the structure and operation of the remaining components.

*Tape cartridge*

Figures 2, 4, 5, 6:
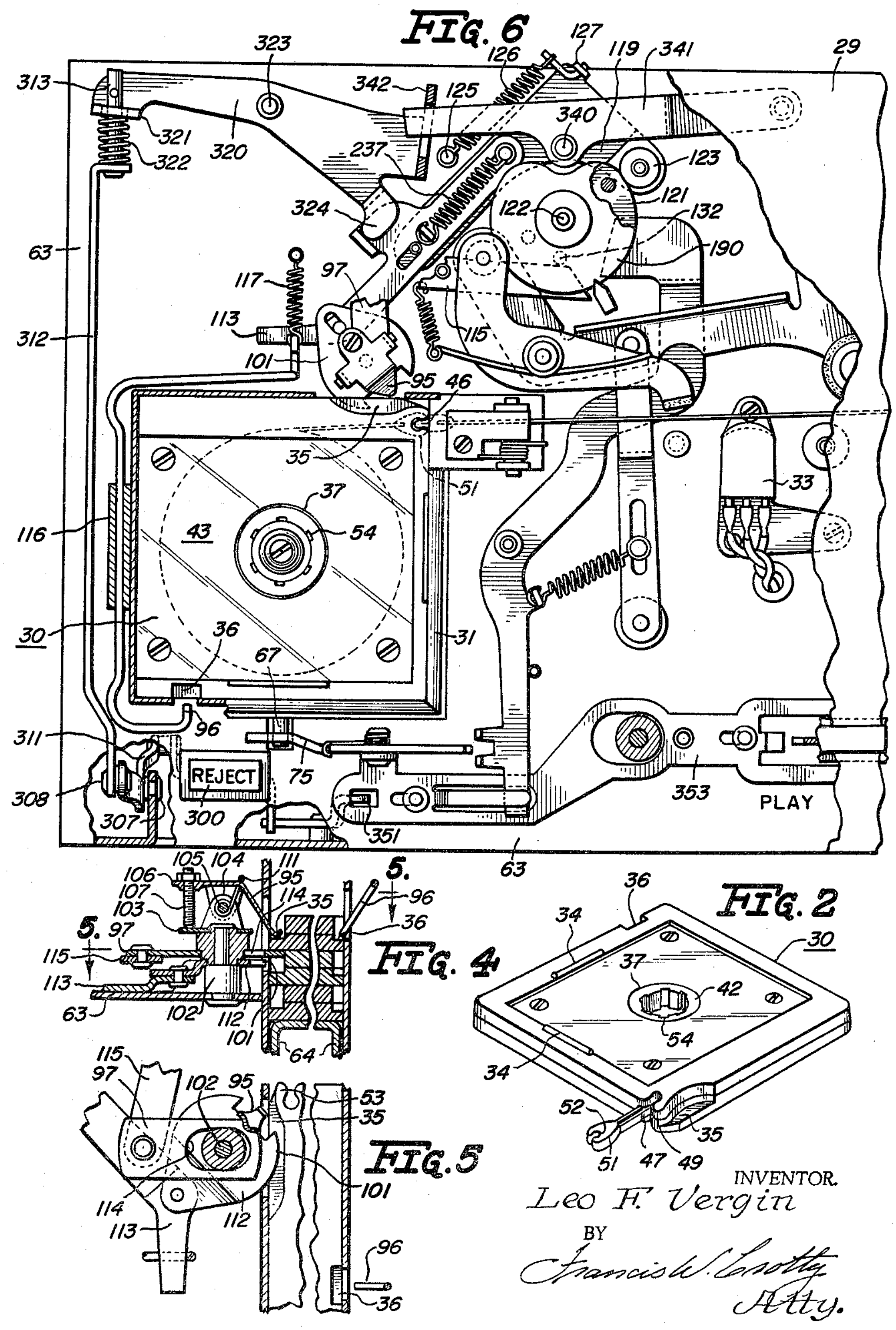
FIGURE 2 is a perspective view of a cartridge of the type preferably employed with the apparatus of FIGURE 1.
FIGURE 4 is a cross-sectional view taken along lines 4—4 of FIGURE 1.
FIGURE 5 is a plan view showing the rotated position of the feed mechanism of FIGURE 4.
FIGURE 6 is a fragmentary plan view, partly broken away, of the apparatus of FIGURE 1 in an alternative position.

The tape cartridge 30 may take any of a variety of specifically different configurations, a suitable one being represented in FIGURE 2. In addition to being a vehicle for program tape, the cartridge is to satisfy other important requirements. Since it is contemplated that the machine may accommodate one or a series of cartridges within storage bin 31, the abutting or contiguous surfaces of successive cartridges arranged in a stack should preferably have provisions to facilitate their nesting with respect to one another in a stable stack. It is also desirable that the cartridge be formed to facilitate the sequential feed of a group of cartridges to a playing position within bin 31, and additionally it is preferred that the cartridges have a brake which precludes the unwinding of tape when the cartridge is stored.

As represented, the cartridges are formed of a pair of essentially rectangular rigid plates with a peripheral flange of such depth that the plates, superposed with their flanges in mating arrangement, define a cavity to accommodate the desired number of convolutions of the magnetic tape of a specific width. Machine screws may retain the plates in assembled relation. The projections 34 on the top surface of one cartridge face may be received by complimentary recess portions in the bottom surface of another cartridge stacked on top of that illustrated in order to achieve an interlocking of the cartridges in the stack. The cartridge plates have a formed section at one side to define a shelf 35 which adapts the cartridge to the sequential feed mechanism 38 presently to be considered. For balancing purposes, a generally similar shelf 36 is formed in the diametrically opposite portion of the cartridge. Each of the plates of the cartridge has a centrally located aperture 37 shown in FIGURES 1 and 2. A hub 42 is interposed between the plates being received within aperture 37.

The inner diameter of hub 42 defines a channelway for accepting a spindle assembly 43 shown in FIGURES 1 and 6 for permitting the cartridge to be threaded over a spindle within storage bin 31. The free end of the magnetic tape 47 of the cartridge terminates in a coupler 51 which appears clearly in FIGURE 2 where for purposes of illustration, a short section of tape 47 is shown withdrawn from the confines of the cartridge. The coupler has a bifurcated configuration which defines a channelway 52 into which a mating coupler or extractor 46, shown in FIGURE 6, may be inserted to couple tape 47 to take-up reel 32. Normally, the tape is completely confined within the cartridge with channelway 52 in alignment with a similar channelway 49 formed in the corner of the cartridge.

As illustrated in FIGURES 1 and 2, the inner periphery of hub 42 bears a series of formed slots or keyways 54 which are the means through which a mechanical driving connection may be completed through the hub from the driving spindle.

*Storage bin*

Figure 3:
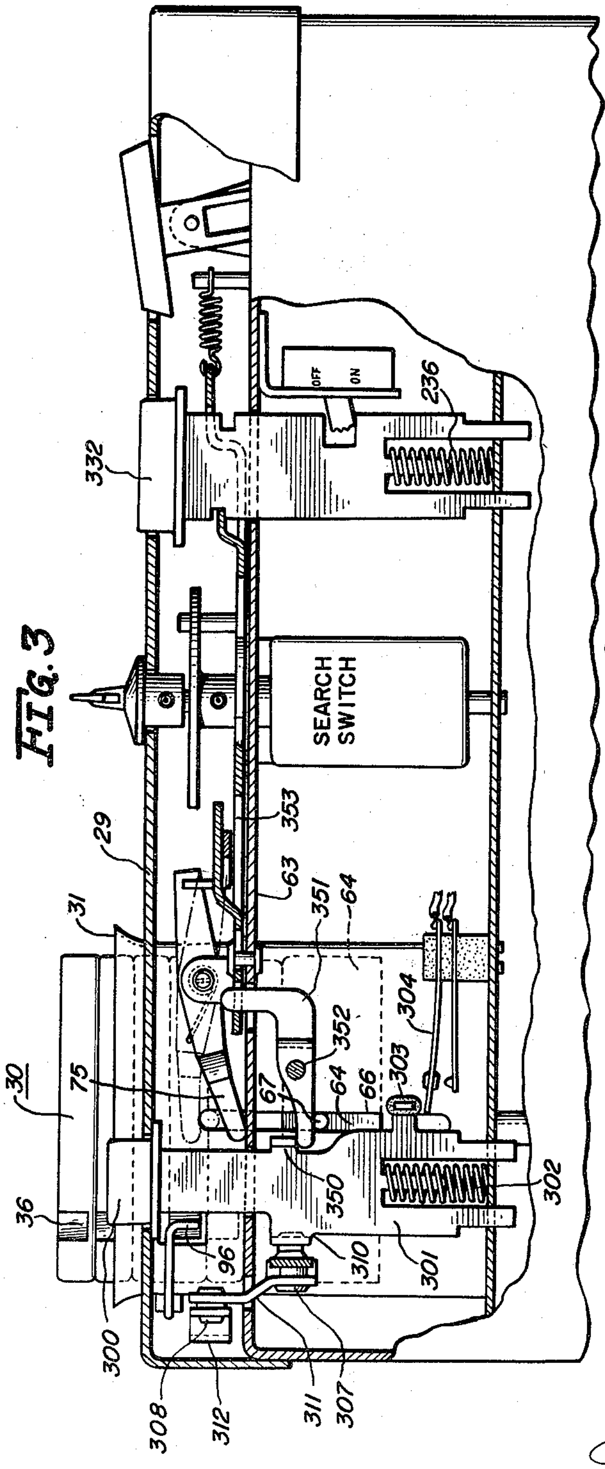
FIGURE 3 is a fragmentary cross-sectional view taken along lines 3—3 of FIGURE 1.

The storage bin 31 is secured to a mounting deck 63 beneath cover 29 and is generally rectangular, dimensioned and formed to accept one or more cartridges 30 with the cartridges horizontally disposed as represented in FIGURES 1 and 3. As shown in FIGURE 3, the bin has a major opening at the top and a platform 64 movably positioned within it disposed opposite that opening for supporting the cartridge. The platform is normally biased in a direction of the open end by a pair of springs (not shown) and recedes toward the bottom of the well as cartridges are loaded therein. The platform assumes a position corresponding to the number of cartridges within the bin. Opposed sides of the bin have vertically disposed slots 66 only one of which is shown in FIGURE 3. A pair of pins 67 extend horizontally from the depending flange portions of platform 64 and ride in the slots in the sides of the bin as guides for the platform movement. One of pins 67 also displaces a bellcrank 75 shown in FIGURE 3, to accomplish automatic shut-off in a manner explained in the previously mentioned copending applications.

*Bin loading*

In briefly describing the loading of cartridges into the bin, it will be assumed initially that there are no cartridges therein and that platform 64 is in its uppermost position. The mounting aperture of the first cartridge is slipped over spindle assembly 43 and pushed downwardly. If the cartridge is in proper alignment, the cartridge may be inserted further by pushing to overcome the springs which urge platform 64 upward. Referring to FIGURE 1, as the cartridge is forced down over the spindle assembly, a pair of elements 95 and 96, which normally rest in the path of the cartridges, yield being deflected outwardly out of the path by the passage of the cartridge itself. Once the cartridge has been inserted sufficiently to place shelves 35 and 36 (FIGURE 4) thereof beneath the level of stop abutments 95 and 96, respectively, the downward pressure on the cartridge may be relaxed because the cartridge will now be retained within the bin. It will be retained at the playing level by the influence of platform 64 which urges the cartridges upwardly against the restraining effects of stop abutments 95 and 96 which overlie stop shoulders 35 and 36 once the cartridge has been inserted to a sufficient depth in the bin. A series of cartridges may be loaded in the same manner and stacked one upon another on the spindle assembly until as many as desired have been stored up to the capacity of the bin. The cartridges will be accepted in the bin only in that orientation which locates their coupler 51 properly to achieve a coupling connection with the companion coupler extractor 46 as shown in FIGURE 6.

When any stored cartridge is to be transcribed in a manner which is described in the previously mentioned copending application of Richard L. Rost, Patent No. 3,105,645, there is an additional element 97, shown in FIGURES 1 and 4, which may project into the bin to preclude adding cartridges during the time a particular cartridge is being transcribed. Lever 97 is controlled by programming mechanism to be described briefly subsequently, but which, however, is also described in detail in the previously mentioned copending applications. Lever 97 rests under shelf 35 of the cartridge instantaneously in the playing position throughout its play. At other times, however, lever 97 is withdrawn so that the feeding of the cartridges may take place both into and out of the bin. For example, it is essential that lever 97 be retracted during a cartridge feed cycle and also during load or reject operations as will be made clear.

*Cartridge sequential feed*

The sequential presentation of cartridges stored within bin 31 to the playing position involves the retraction of stop abutments 95 and 96 to release the cartridge instantaneously in the playing position and, at the same time, the introduction of a third stop abutment 101 into the feed path of the cartridges so that the stack has restricted movement, limited to advancing substantially only the thickness of one cartridge in each feed cycle. The mechanism for carrying out this process is shown in FIGURES 1, 4, 5 and 6. Initial consideration will be given to the assembly including stop abutments 95 and 101.

As shown in FIGURES 4 and 5, a post assembly 102 is secured to plate 63 and at its upper surface carries a T-shaped member 103 which has upstanding flange portions 104 at opposed ends of what is generally considered the horizontal portion of the T. These flanges are apertured to receive a stub shaft 105 upon which are pivotally supported depending flanges of a stop plate 106. Post assembly 102 is mounted adjacent one side of bin 31 and stop abutment 95 constitutes a forward extending projection of member 106 normally disposed through an opening in the bin into the feed path of the cartridges as clearly shown in FIGURE 4. An oppositely directed extension of member 102 accommodates an adjusting screw 107 and a spring 111 coiled about shaft 105 urges stop plate 106 in a counterclockwise direction; its normal resting position is determined by the engagement of threaded pin 107 with member 103. The adjustment of pin 107, in controlling the position of stop abutment 95, restricts the upward movement of cartridge 30 under the influence of the upwardly biased platform 64 and in this fashion locates the cartridge engaged by the stop abutment at a precise level for playing.

Stop abutment 101, as shown most clearly in FIGURE 5, comprises one tine of a bifurcated lever 112 affixed to a reduced diameter section of post assembly 102 so that the rotation of the lever effects rotation of stop abutments 95 and 101. Lever 112 is pivotally connected to a driving lever 113 which may be actuated to oscillator lever 112 about post assembly 102.

The bifurcation in lever 112 makes room for the free end of abutment 95 which, in loading cartridges into the bin, is deflected out of the bin and into the plane of lever 112. Of course, if abutment 95 is short enough not to extend into the plane of lever 112, this bifurcation is not required. The location of lever 112 on post assembly 102 is selected to present stop abutment 101 at a level which is above shelf 36 of the cartridge immediately below the cartridge instantaneously in a playing position within the bin.

Intermediate plate 112 in the uppermost portion of post assembly 102 is slide plate 97 which extends into bin 31 into the feed path of the cartridges, as shown in FIGURE 4, at all times except during a cartridge feeding style, cartridge reject or during an index or reference condition in which the machine is established when not in use or when the bin is to be loaded. Slide plate 97 has an elongated slot 114 through which post assembly 102 projects. This slot is dimensioned to permit retraction of slide plate 97 from the feed path of the cartridges, as shown in FIGURE 5, under the influence of an actuating lever 115 to which slide plate 97 is pivotally connected and also to permit post assembly 102 to rotate relative to this plate.

Stop abutment 96 is a companion to abutment 95, extending into the opposite wall of bin 31 and engaging shelf 36 of the cartridge to balance the effect of abutment 95. Abutment 96, as represented most clearly in FIGURE 1, is the return-bend portion of a generally U-shaped wire or rod, which, at its opposite end has a configuration to assist in effecting a mechanical connection to lever 113 which actuates lever 112, this connection permitting lever 113 concurrently to actuate both abutments 95 and 96. The connection is easily effected by forming a J-shaped termination at the actuated end of rod 96. Preferably, the rod passes freely from an elongated guide 116 supported on the deck of the mechanism and a bias spring 117 urges the rod to introduce the end thereof through an aperture of bin 31.

The timed operation of abutments 95, 96 in relation to abutment 101 is accomplished by a cam 121 affixed to the free end of a drive shaft 122 for rotation therewith. Cam 121 and drive shaft 122 along with another cam to be described subsequently are parts of a program mechanism for controlling the operation of the transport and feed mechanisms. As shown in FIGURES 1 and 6, actuator 113 is caused to move due to the movement of an L-shaped lever 119 with a cam roller follower 123 rotatably supported at one end and terminating at its opposite end in two posts 330 and 331 as shown most clearly in FIGURE 7. A spring 126 is anchored to pin 125 and to a finger 127 to urge the actuator generally in the direction of bin 31. Displacement of lever 119 in that direction causes movement of lever 113 which rotates lever 112 in a counterclockwise direction because of its pivotal engagement with lever 113 and concurrently displaces rod 96 to retract its free end from its normal position within the bin.

Actuator 115 of slide plate 97 is pivoted to a pin 128 also extending from frame plate 63 as shown in FIGURES 1 and 6. A spring 131 extending between the actuator and the stationary bracket urges the actuator in a counterclockwise direction to introduce the free end of slide plate 97 into the cartridge feed path. Actuator 115 may be rotated in a clockwise direction to retract slide plate 97 from the bin by means of a pair of pins 132 and 133 which depend from the lower surface of cam 121.

At the start of a cartridge change cycle, slide plate 97 and stop abutments 95, 101 and 96 have the relative positions represented in FIGURE 4. As the apparatus enters the change cycle, cam 121 rotates in a counterclockwise direction and presents pin 132 to lever 115, withdrawing plate 97 from the feed path of the cartridge. Directly thereafter, the low sector of the cam is presented to cam follower 123 which then permits spring 126 to slide actuator 119 and lever 113 in the direction of bin 31. This causes oscillation of post assembly 102, rotating stop abutment 95 out of the path of cartridges but introducing stop abutment 102 into that path at a point below the cartridge which has been at the playing level or position in the bin. At the same time, displacement of actuator 102 retracts stop abutment 96 and the complete condition is that represented in FIGURE 5. The uppermost cartridge is now free and is ejected from the playing position while the cartridge immediately thereunder is introduced into the playing position. Continuing rotation of cam 121 restores stop abutments 95 and 96 to their normal position shown in FIGURE 4 and retracts stop abutment 101. The pin 132 clears actuator 115, but spring 131 is not permitted to advance slide plate 97 to its normal position extending into the bin because pin 133 is now in engagement with actuator 115. The actuator 115 remains withdrawn as the cartridge feed cycle is completed.

It is appropriate to point out that the actuation of slide plate 97 occurs once in each revolution of cam 121 and the plate remains withdrawn during what may be referred to as the index or reference position. It is the index position in which the apparatus stops in response to automatic shut-off as explained in the previously mentioned copending application of Richard L. Rost, Patent No. 3,105,645 and the retraction of slide plate 97 is necessary in order that cartridges may be loaded into the bin as previously explained.

*Individual cartridge reject arrangement*

As a feature of the invention, a reject control 300 shown in FIGURES 1, 3 and 6 cooperates with the previously described cartridge sequential feed mechanism so that the mechanism may be manually operaed independently of rotation of cam 121. However, it is important that reject control 300 bring about cartridge ejection only at appropriate times and a lost motion and lock out arrangement is therefore provided. It should be noted that the term manually operated includes manually depressing control 300 or actuating control 300 by manually operated remote control. It is also desirable to have control 300 act as an electrical reject mechanism for actuating the programming mechanism as described in the previously mentioned copending applications and thus control 300 is a unitary control for initiating both manual and electrical cartridge ejection. Control 300 has a first position, effective during the playing cycle, for interrupting the playing cycle and for initiating a rewind cycle and a second position effective during rest intervals of the transport mechanism to actuate the feeding mechanism.

To accomplish actuation of the programming mechanism, control 300 is coupled to a slide bar 301 which passes through an opening in deck 63 and is biased in an upward direction by a spring 302 coupled between slide bar 301 and the supporting structure of the apparatus. A finger 303 extends from the slide bar and is positioned to engage a normally opened electrical switch pair 304.

In operation, when tape is being transported and reject control 300 is depressed, finger 303 closes switch pair 304 which sends the programming mechanism of the apparatus into a reject-rewind mode as described in the previously mentioned copending applications. After all the tape is returned to the cartridge, the reject control may be again actuated and the manual reject apparatus to be described will mechanically reject a cartridge from the bin each time the control is actuated. Thus reject control 300 serves as a control means, effective during the playing cycle, for interrupting the playing cycle and initiating a rewind cycle and effective during rest intervals of the transport mechanism to actuate the supply reel feeding mechanism.

As previously mentioned, it is of prime importance that the cartridges be manually ejected only when the programming mechanism is in an operating condition in which no tape is outside of the confines of the cartridge. When this condition exists, control 300 may be depressed to a second position further downward than the first position in which switch pair 304 is actuated. In this lower position control 300 mechanically ejects cartridges remaining to be played without the necessity of transcribing any portion of each such cartridge. A finger 310 projects from bar 301 and is pivotally coupled to one end of a bellcrank 311 rotatably supported on a pivot pin 307 which is firmly affixed to the support structure as shown in FIGURES 1, 3 and 6. The remaining end of bellcrank 311 is pivotally coupled by means of a pin 308 to a rod 312 which runs along the surface of deck 63 adjacent bin 31.

Figure 7:
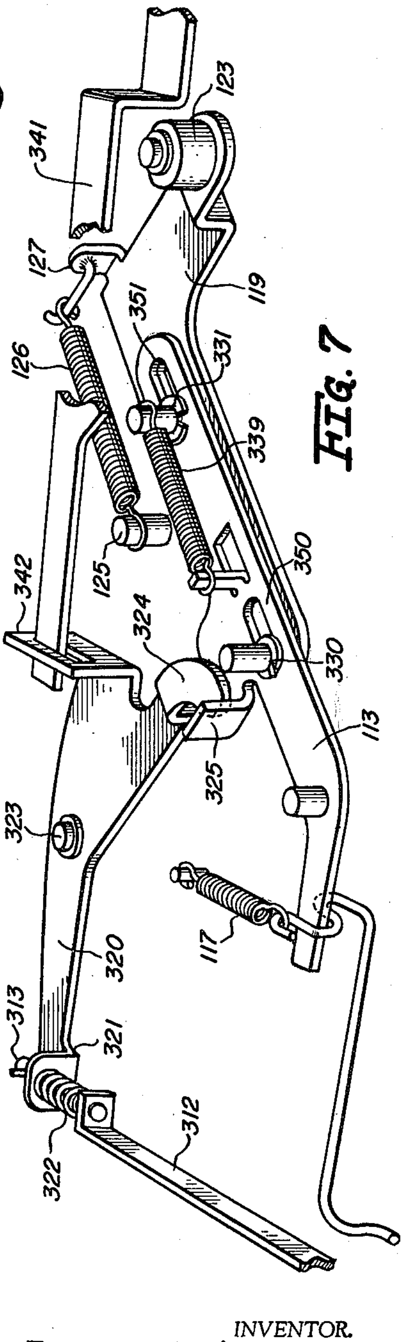
FIGURE 7 is a fragmentary perspective view of a portion of the cartridge ejecting linking apparatus of FIGURES 1 and 6.

The lost motion mechanism comprises a bellcrank 320 pivotally mounted at a post 323 to deck 63 and having a vertical finger 321 through which shaft 313 passes as best shown in FIGURE 7. A spring 322 is coiled about shaft 313 and bears against one surface of finger 321 which has an opening therein to accommodate shaft 313. In addition, bellcrank 320 has a second finger 324 bearing against a vertical tab 325 of lever 113. Rotation of bellcrank 320 clockwise causes finger 324 to move lever 113 in the same direction as does plate 119 under control of cam 121. Two vertical posts 330 and 331 are affixed to slide plate 119 and pass through elongated openings 350, 351, respectively, in slide lever 113. Openings 350, 351 allow lever 113 to move toward bin 31 independently of lever 119 and thus lever 113 is allowed to move freely under the influence of bellcrank 320. A spring 339 is coupled between post 331 and a tab on lever 113 for returning lever 113 to an inoperative position when it is not actuated by either bellcrank 320 or lever 119.

As previously mentioned, it is desirable to have reject control 300 mechanically eject cartridges at only certain times. To insure this, there is a lock out arrangement comprising a roller follower 340 supported by a bar 341 rotatably affixed at one end to deck 63. The remaining end of bar 341 passes through an elongated window in a rectangular tab 342 of bellcrank 320. Along with the previously mentioned cam 121 of the programming mechanism a second cam 190 is employed as part of the lock out arrangement and is mounted concentrically with cam 121. The cam roller 340 is conveniently positioned so that it may readily follow cam surface 190 as shown in FIGURES 1 and 6. When follower 340 is in contact with the high portion of cam 190, bar 341 bears against one side of the window in tab 342 preventing rotation of bellcrank 320. When roller 340 is in contact with the low sector of cam 190, the bellcrank is free to rotate. Cam 190 may be considered to have a first position corresponding to the playing cycle of the apparatus and the reject control means are mechanically coupled to the cam by way of bar 341 and roller 340. When the cam is in a first position, the operator may interrupt the playing cycle of the transport and initiate a rewind cycle of the apparatus by depressing the reject control. When the cam is in another position, specifically with the low sector presented to roller 340, the control means directly actuates the feeding mechanism.

The operation of the lock out and lost motion linkage will be first explained under the condition when tape is being transported by the apparatus or is otherwise out of cartridge 30. When control 300 is depressed, finger 303 closes switch pair 304 and brings about a reject-rewind mode causing the programming apparatus to achieve a cartridge change or escape position which is the only position in which the low sector of cam 190 is presented to follower 340. Since the low sector of cam 190 has not been presented to roller 340 when the reject control 300 is depressed, bellcrank 320 does not rotate and the sequential feed mechanism is not actuated. It should be noted that the sequential feed mechanism will, however, become operative at the end of the reject-rewind mode due to the action of cam 121, roller 123 and slide plate 119. Thus, control 300 serves as control means for initiating a rewind cycle and for actuating the feeding mechanism to eject the supply reel whose transcription has been interrupted.

As bellcrank 320 is not permitted to rotate when the reject control is depressed to initiate rewind, spring 322 is compressed when link 312 is moved under the influence of bellcrank 311. Thus while the reject control 300 may be fully depressed to its second position, the sequential feed mechanism remains inactive until the electrical reject-rewind mode brought about by the programming mechanism actuates the feed mechanism as previously explained.

When the low sector of cam 190 is presented to roller 340, which condition occurs after a rewind-reject operation has been completed and the reject control 300 is depressed, belcrank 320 is free to rotate. As shown in FIGURES 3 and 6, depressing control 300 now causes bellcrank 311 to move link 312 along deck 63 so that spring 322 imparts the transmitted force to bellcrank 320 causing its rotation. Finger 324 engages tab 325 and slides plate 113 against the action of spring 339. This movement of plate 113 brings about a portion of a cartridge change cycle, as previously explained, which is completed when control 300 is released. When reject button 300 is released, spring 339 returns lever 113 and the feed mechanism to their rest positions and the slightly compressed spring 322 returns control 300 to its rest position. By repeatedly depressing the control, all the cartridges remaining in the bin may be ejected without the need of transcribing any portion of each cartridge.

It is of importance to prevent the machine from transcribing the next cartridge after one has just been ejected. Because cartridge transcription may be initially brought about only when the play button 332 is depressed, provision is made for releasing the play button. When the reject control 300 is fully depressed to its second position, the play button is automatically released. As best shown in FIGURE 3, a third finger 350 extends from slide lever 301 and is positioned for engagement with one end of a belcrank 351 pivoted around a post 352 which is, in turn, affixed to the side of bin 31. The remaining end of bellcrank 351 passes through a slot in a play button release lever 352 slidably mounted along deck 63 and retains the play control 332 of the apparatus in its depressed position against the action of a bias spring 236.

When the reject button 300 is fully depressed, finger 350 engages bellcrank 351 and causes it to rotate about pin 352, sliding plate 353 to the left and releasing play button 332. Spring 236 causes play button 332 to move upward to its off position and further transcription of the cartridges remaining in the bin cannot occur until the play button is once again depressed.

Although the configurations of the automatic control linkages and search switch-play button interlock levers appear slightly different than that shown in the previously mentioned copending applications, their operation is identical and will not be discussed in detail here. Reference is also made to the previously mentioned copending applications for a complete description of the control circuitry, search switch control automatic shut-off and overall operation of the device.

Thus, the invention provides a new and improved reeling apparatus which may automatically play a plurality of pre-recorded tapes contained in cartridges. The structure includes apparatus which ejects any number of cartridges remaining to be transcribed without the need for transcribing any portion of each one. By employing lost motion linkages and lock-out features, the reject apparatus is easy to operate and malfunction of the transcribing apparatus is prevented.

While a particular embodiment of the present invention has been shown and described, it is apparent that changes and modifications may be made therein without departing from the invention in its broader aspects. The aim of the apended claims, therefore, is to cover all such changes and modifications as fall within the true spirit and scope of the invention.

I claim:

1. Reeling apparatus for transcribing a plurality of flexible tapes, each respectively housed on separate supply reels, said apparatus comprising:
- a bin having a major opening for accepting and storing said supply reels;
- a supply-reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- and a single manually actuated control member, effective during said playing cycle, for interrupting said playing cycle and initiating said rewind cycle and effective during rest intervals of said transport mechanism for directly actuating said supply-reel feeding mechanism.

2. Reeling apparatus for transcribing a plurality of flexible tapes, each respectively housed on separate supply reels, said apparatus comprising:
- a bin having a major opening for accepting and storing said supply reels;
- a supply-reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- and a single manually actuated control member, effective during said playing cycle, for interrupting said playing cycle, for initiating said rewind cycle and for actuating said feeding mechanism to eject the supply reel whose transcription has been interrupted, and effective during rest intervals of said transport mechanism to directly actuate said supply-reel feeding mechanism.

3. Reeling apparatus for transcribing a plurality of flexible tapes, each respectively housed on separate supply reels, said apparatus comprising:
- a bin having a major opening for accepting and storing said supply reels;
- a supply reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- and a single manually actuated control member having a first operating condition during said playing cycle, such that actuation of said single control member effects interruption of said playing cycle and initiation of said rewind cycle and having a second operating condition during rest intervals of said transport mechanism such that actuation of said single control member effects direct actuation of said supply-reel feeding mechanism.

4. Reeling apparatus for transcribing a plurality of flexible tapes, each respectively housed on separate supply reels, said apparatus comprising:
- a bin having a major opening for accepting and storing said supply reels;

- a supply reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- a single manually actuated control member for controlling said program mechanism to interrupt said playing cycle and initiate said rewind cycle and also effective for directly actuating said feeding mechanism;
- and means for disabling the control of said feeding mechanism by said single control member throughout the duration of said playing and rewind cycles of said transport mechanism.

5. Reeling apparatus for transcribing a plurality of flexible tapes, each respectively housed on separate supply reels, said apparatus comprising:
- a bin having a major opening for accepting and storing said supply reels;
- a supply reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- a single manually actuated control member for controlling said programming mechanism to interrupt said playing cycle and initiate said rewind cycle and also effective for directly actuating said feeding mechanism;
- and means, included in said program mechanism, for disabling the control of said feeding mechanism by said single control member throughout the duration of said playing and rewind cycles of said transport mechanism.

6. Reeling apparatus for transcribing a plurality of flexible tapes, each respectively housed on separate cartridge supply reels, said apparatus comprising:
- a bin having a major opening for accepting and storing said cartridge supply reels;
- a supply-reel feeding mechanism for sequentially feeding one stored tape cartridge reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;
- a single manually actuated control member having a rest position, having a second position in which said program mechanism is controlled to rewind and eject the tape cartridge being transcribed, and having a third position in which said feed mechanism is directly actuated to eject one of said cartridges;
- and lock out means for preventing displacement of said single manual control member to said third position during said transcribing and rewind cycles of said transport mechanism.

7. Reeling apparatus for transcribing a plurality of flexible tapes, each respectively housed on separate cartridge supply reels, said apparatus comprising:
- a bin having a major opening for accepting and storing said cartridge supply reels;
- a supply reel feeding mechanism for sequentially feeding one stored reel at a time from said bin;
- a transport mechanism having a playing cycle for transcribing said tapes and having a rewind cycle for rewinding said tapes on their supply reels;
- a program mechanism for controlling the operation of said transport mechanism and said feeding mechanism;

a single manually actuated control member having a rest position, having a second position in which said program mechanism is controlled to rewind and eject the tape cartridges being transcribed, and having a third position in which said feed mechanism is directly actuated to eject one of said cartridges;

a shut-off mechanism for said transport;

and a coupling between said single control member and said shut-off mechanism for operating said shut-off mechanism in response to displacement of said single control member from said rest position toward said third position.

8. Apparatus for transcribing a plurality of flexible tapes, each housed on separate supply reels, said apparatus comprising: a transcription station from which supply reels are transcribed; a bin positioned beneath said transcription station and having a major opening for accepting and storing said supply reels; a supply reel feeding mechanism for sequentially feeding one stored reel at a time upward from said bin to said transcription station; a transport mechanism having a playing cycle for transcribing said tapes from said transcription station and having a rewind cycle for rewinding said tapes on said supply reels; a program mechanism for controlling the operation of said transport mechanism and said feeding mechanism; and a single manually operable control member, effective during said playing cycle for interrupting said playing cycle and initiating said rewind cycle, and effective during rest intervals of said transport mechanism for directly actuating said supply reel feeding mechanism to move a supply reel upward from said bin to said transcription station without actuation of said program mechanism.

References Cited by the Examiner

UNITED STATES PATENTS

| | | | |
|---|---|---|---|
| 3,025,011 | 3/62 | Camras | 242—55.13 |
| 3,100,090 | 8/63 | Goodell et al. | 242—55.13 |

MERVIN STEIN, *Primary Examiner.*

JOSEPH P. STRIZAK, *Examiner.*